Patented Jan. 12, 1937

2,067,355

UNITED STATES PATENT OFFICE 2,067,355

CLEANING COMPOSITION

Leo V. Steck, Oakland, Calif., assignor to Shell Development Company, San Francisco, Calif., a corporation of Delaware No Drawing. Application April 12, 1933, Serial No. 665,778

6 Claims. (Cl. 87—5)

This invention relates to a cleaning composition which is suitable for cleaning, scouring, spotting work, the degreasing of textiles, leathers, metals, metal polishes, etc. The active ingredient thereof may be employed in admixture with loosening solvents as a paint, varnish and lacquer removing composition. Some of these solvents will be classified under alcohols, glycols, halohydrins, ketones, halogenated ketones, esters, acids, common halogenated hydrocarbons, alkylolamines, and the like.

Cleaning agents previously available for the removal of paints, varnishes, oils, greases, lip-stick and the like from synthetic silks composed of cellulose esters and/or ethers were solvents for the artificial silk as well, and particularly for cellulose acetate silk. Consequently, in the past it has been found necessary to dilute these harmful chemicals with solvents which are safe on cellulose acetate fibers, filaments, threads or yarns, thereby decreasing the solvent powers of the mixture below those possessed by the original harmful solvent.

I have found that a dichlorbutane is an ideal dirt, paint and grease remover and has no detrimental effect on celanese colors or luster.

I may state, as a general rule, that liquid chlorinated organic compounds which have a boiling-point above 113° C. do not form explosive mixtures with air at 22° C., since a sufficiently high concentration of the vapor cannot be obtained. This is one of the reasons why a dichlorbutane is preferable to a dichlorpropane as the former boils above 117° C. while the latter boils at 96.8° C. Dichlorbutane is very stable and can be used in cleansing apparatus made of iron whereas when carbon tetrachloride is employed, resort must be had to machines made of nickeled copper.

The chlorides of ethylene have an inherent tendency to hydrolyze and weaken most fabrics cleaned in them, especially cellulose acetate silks and accordingly have to be used rather carefully to prevent injury to the fabric being cleaned. Carbon tetrachloride tends to leave textiles cleansed with the same in a spotted state while propylene dichloride will remove dyes which are not affected by dichlorbutane.

The flash-point of dichlorbutane is about 75° F. which is higher than that of propylene dichloride (61° F.) or of ethylene dichloride (57° F.). This tends to reduce the fire hazard involved in its use and makes a relatively smaller amount of the corrosive carbon tetrachloride necessary to produce an excellent and non-inflammable composition.

Dichlorbutane can be added to hand-brushing solutions and may be incorporated with soaps whereby the detergent action of the soap is enhanced. When used in or with scouring preparations, the composition is not only an ideal dirt or grease remover but at the same time may be a disinfectant.

Whether it is 2.3 or a 1.2 dichlorbutane or a mixture of the same is not of practical importance since their chemical and physical properties are so much alike. They are non-hygroscopic and all are substantially immiscible with water while being substantially miscible with the known organic solvents. It may be pointed out that the dichlorbutanes are better than propylene dichloride in that the former not only have a higher flash-point and a greater degree of penetrability but also possess a considerably less solvent action on the dyestuffs commonly used on artificial silks. At the same time, dichlorbutane possesses the desirable properties of propylene dichloride in that it does not dissolve cellulose acetate silks at room temperature. Dichlorbutane acts to minimize the tendency of carbon tetrachloride to form rings when used for spotting purposes, due in part to its raising the boiling point range of the solution.

Mixtures consisting over 50 percent dichlorbutane are suitable for cleaning and spotting purposes and, where required by law, the flash-point thereof may be maintained above 100° F. by the incorporation therein of a suitable solvent possessing no flash-point, such as carbon tetrachloride, tetrachlor ethylene, trichlor ethylene, etc., or one materially above 100° F., such as ortho dichlor benzene, and similar halogenated aromatic bodies. Suitable mixtures are:

| | Percent | Flash-point |
|---|---|---|
| Dichlorbutane | 86 | 105° F. |
| Carbon tetrachloride | 14 | |
| Dichlorbutane | 88 | 100° F. |
| Carbon tetrachloride | 12 | |

An excellent cleaning composition is one which is an emulsion of at least one dichlorbutane, a detergent, and water. For example, an emulsion of dichlorbutane, monoethanolamine, oleic acid and water was effective in removing oil-soluble as well as water-soluble stains from cellulose acetate silk in one dip. Any detergent, such as soaps or sulfonated alcohols or sulfonated oils, may be employed in lieu of the alkylolamine-fatty acid soap. The concentrate of detergent and dichlorbutane can be emulsified just prior to its use whereby savings are effected on the transportation of the same. The emulsion combines the properties of an active solvent with the detergent properties of a soap-water solution. It is of value in textile scouring and wetting out, and for household applications such as the cleaning of woodwork, polishing of metals and the scrubbing of rugs.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A fluid cleaning composition consisting of from about 88% to 50% of a dichlorbutane mixed with about 12% to 50% of a liquid organic grease solvent.

2. A fluid cleaning composition consisting of from about 88% to 50% of a dichlorbutane mixed with about 12% to 50% of a liquid polychlorinated hydrocarbon.

3. A fluid cleaning composition consisting of from about 88% to 50% of a dichlorbutane mixed with about 12% to 50% of a liquid polychlorinated hydrocarbon of the class consisting of carbon tetrachloride, trichlorethylene, tetrachlorethylene and ortho-dichlorbenzene.

4. A fluid cleaning composition consisting of from about 88% to 50% of a dichlorbutane mixed with about 12% to 50% of carbon tetrachloride.

5. A fluid cleaning composition consisting of about 86% of a dichlorbutane mixed with about 14% of carbon tetrachloride.

6. A fluid cleaning composition essentially consisting of at least 50% of a dichlorbutane mixed with a substantial quantity of a liquid organic grease solvent.

LEO V. STECK.